Jan. 5, 1965    A. W. ATKINSON    3,164,109
MEANS FOR MOUNTING A SERVING TRAY WITHIN A VEHICLE
Filed Jan. 14, 1963
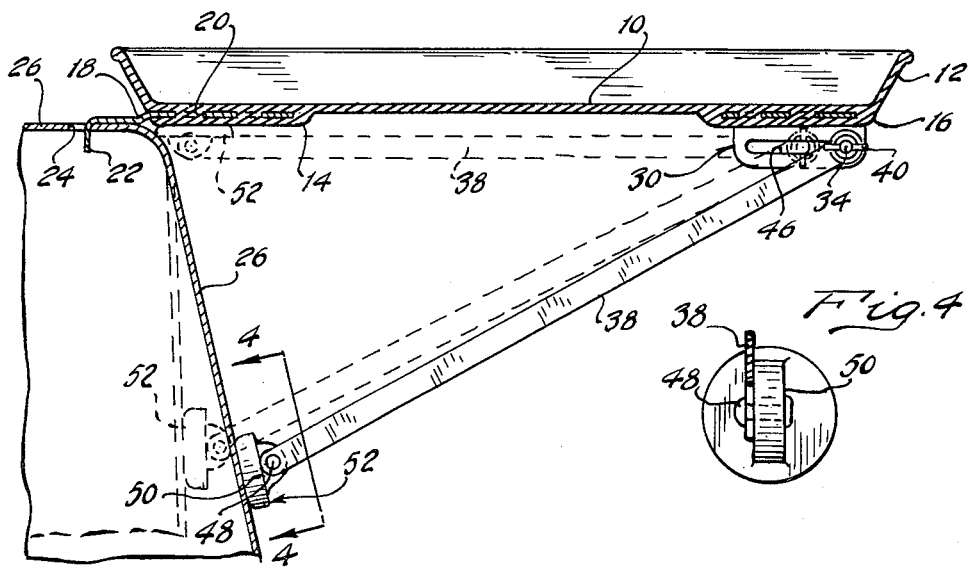
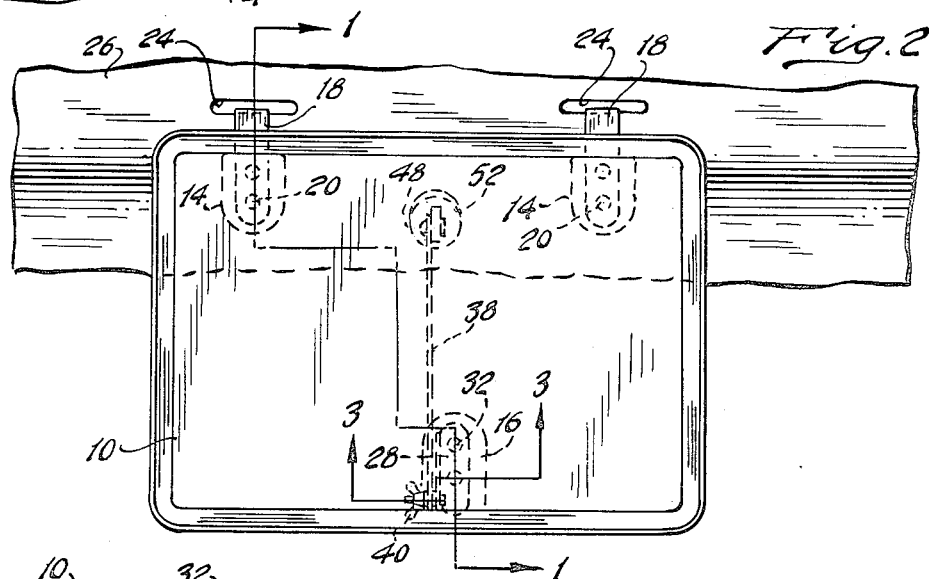
INVENTOR:
A. W. ATKINSON
BY
ATTORNEYS.

3,164,109
MEANS FOR MOUNTING A SERVING TRAY WITHIN A VEHICLE
A. W. Atkinson, Box 436, Gatesville, Tex.
Filed Jan. 14, 1963, Ser. No. 251,155
2 Claims. (Cl. 108—44)

My invention relates generally to serving that are adapted especially to be used within an automotive vehicle. More particularly, my invention relates to an adjustable serving tray that can be mounted removably at any of several locations within an automotive vehicle. My invention relates also to a method for utilizing such a serving tray.

I am aware of various tray constructions and methods for mounting them on the exterior of the vehicle. Such trays normally are used at so-called drive-in restaurants for the purpose of serving the vehicle passengers without requiring the passengers to exit from the vehicle. They normally are mounted on the outside of the vehicle adjacent an open window. Since they require one window of the vehicle to be open, they cannot conveniently be used under foul weather conditions.

It is an object of my invention to provide a serving tray that would overcome the disadvantages of conventional trays and which is adapted to be mounted at a location adjacent a window inside the vehicle in such a way that the window may be opened or closed in the usual fashion without interference with the tray. I contemplate also that my improved tray arrangement can be supported by the vehicle dash structure to provide convenient access by the front seat passengers of the vehicle.

It is another object of my invention to provide an improved method for mounting a tray within a vehicle in such a way that the vehicle passengers can enjoy the advantages referred to in the foregoing paragraphs.

It is another object of my invention to provide a vehicle serving tray that provides a maximum degree of convenience regardless of adverse weather conditions.

It is a further object of my invention to provide a tray of the type set forth in the foregoing paragraphs and which is characterized by its simplicity of construction. I contemplate that my tray construction can be formed by using known manufacturing techniques without the need for employing special tooling.

It is a further object of my invention to provide a tray capable of being mounted within a vehicle and which can be adapted for convenient storage with a minimum amount of storage space being required.

It is a further object of my invention to provide a tray construction that may be mounted in a secure fashion at any of several convenient locations within a vehicle and which may be removed readily when not in use.

For the purpose of describing more particularly the improvements of my invention, reference will be made to the accompanying drawings wherein:

FIG. 1 shows in partial cross sectional form my improved tray construction mounted upon an interior structural member of an automotive vehicle, the plane of FIG. 1 being taken along section line 1—1 of FIG. 2;

FIG. 2 is a plan view of the tray arrangement of FIG. 1;

FIG. 3 is a partial cross sectional view taken along section line 3—3 of FIG. 2; and FIG. 4 is a partial plan view of a friction pad or foot for the construction of FIG. 1 as viewed from the plane of section line 4—4 of FIG. 1.

Referring first to FIGS. 1 and 2, a platform portion of the tray is designated by reference character 10. By preference, this platform is of rectangular construction as seen in FIG. 2. It is surrounded by a wall 12. This wall 12 extends in a generally upward direction from the periphery of the platform portion 10.

The wall 12 and the platform portion 10 may be formed of a suitable thermo-plastic material as a single one piece moulding.

The moulding die can be adapted to provide a pair of bosses 14 located near one margin of the tray. These bosses are formed at a location that is equidistant from the geometric center line of the platform portion 10.

A third boss 16 is located on a side of the tray that is opposite to the side on which the bosses 14 are formed. This boss 16 is located proximate to the geometric center line of the tray.

Moulded within each boss 14 is a strap 18. As indicated in FIG. 4, each strap 18 is embedded within the plastic that forms the boss 14. Strap 18 may be formed with openings 20 to permit a permanent attachment between the strap 18 and the tray, the plastic material flowing into the openings to provide a so-called rivet.

The extended end of each strap 18 is bent into a right angle form as indicated in FIG. 1 at 22. This extended end 22 is adapted to be received within a slot 24 formed in an interior structural member 26 of an automotive vehicle. This member 26 can be the vehicle dash structure or it may be the window sill structure.

Two such slots 24 can be provided, one slot accommodating each of the two straps 18. I contemplate also, however, that one extended slot may be provided for receiving the straps 18.

A boss 16 receives one leg 28 of an angle bracket that is identified generally by reference character 30. Like the straps 18, the leg 28 is apertured as shown at 32 in FIG. 2 to provide a permanent fastening between the tray and the bracket 30, the leg 28 being embedded in the material of the boss 16 as indicated in FIG. 3.

The depending portion of the bracket 30 has formed therein a bolt opening for receiving a bolt 34. If desired, a washer 36 can be provided between the head of the bolt and the depending portion of the bracket 30.

A supporting leg 38 is formed at its end with an opening through which the bolt 34 extends. A wing nut 40 is provided for the purpose of clamping the end of leg 38 to the depending portion of bracket 30. Suitable washers 42 and 44 can be provided if desired.

Referring next to FIG. 1, the opening for the bolt 34 is in the form of an elongated slot identified by reference character 46. Thus, by appropriately employing the wing nut 40, the point of attachment of the end of leg 38 with the platform portion of the tray can be adjusted.

The lowermost end of the leg 38 is apertured for the purpose of receiving a rivet 48, as indicated in FIG. 4. This rivet is received through an eyelet 50 formed on a friction pad or foot, preferably circular in form, which can be made by moulding compressible rubber material. The eyelet 50 and the foot 52 preferably are integral in construction and formed as a single moulding.

The rivet 48 can be received within its cooperating opening in the end of leg 38 with a force fit. The eyelet 50, however, is received over the rivet 48 with a sufficient clearance to provide angular adjustment of the foot 52 with respect to the leg 38.

In the embodiment shown, the foot 52 provides a friction surface that may be adjusted when the tray is mounted until it is co-planar with respect to the depending portion of the vehicle structural member 26.

The angularity of the leg 38 with respect to the pivot point provided by bolt 34 can be adjusted for any suitable structural environment. Under some conditions, depending upon the interior vehicle design, a relatively steep angle will be required. But in other cases the leg 38 will be relatively close to the plane of the platform portion 10. The pivot point provided by bolt 34 to the desired position in the slot 46. This adjustment and the ability of the leg 38 to be adjusted angularly adapts the tray mechanism for a wide variety of operating environments.

My tray construction provides a firm support for articles such as soft drinks and refreshments that normally would be purchased at a drive-in restaurant. It cannot be dislodged by accidental contact by the vehicle passengers. The level of the platform portion 10 can be controlled so that it will always be in a substantially horizontal plane.

The tray arrangement of this embodiment is of simplified construction and can be manufactured with a minimum amount of tooling investment. Furthermore, a minimum amount of manufacturing cost is involved when they are manufactured in a volume basis.

When the tray construction is removed, the leg 38 can be adjusted to the phantom line position illustrated in FIG. 1 and conveniently stored with a minimum of storage space being required. When the tray is mounted within a vehicle, the vehicle windows can be opened and closed in a normal fashion since none of the components of the tray construction will interfere with this operation.

Having thus described a preferred form of my invention, what I claim and desire to secure by U.S. Letters Patent is:

1. A serving tray for use in the interior of a vehicle comprising a platform portion formed of thermo-plastic material, a pair of straps connected to one margin of said platform portion and extending beyond said margin, said straps being imbedded in said thermo-plastic material and being bent whereby they are adapted to be received within cooperating slots formed in a structural portion of said vehicle, said straps being substantially equidistant from the geometric center line of said platform portion, a bracket having a portion thereof imbedded in said thermoplastic material at an opposite margin thereof and at a position adjacent to said geometric center line, a supporting leg, an adjustable connection between one end of said supporting leg and said bracket, said adjustable connection accommodating an adjustment of said one end in a direction parallel to the plane of said platform portion, said adjustable connection providing also angular adjustment of said leg with respect to the plane of said platform portion, a friction foot carried by the other end of said leg, said friction foot being adapted to engage a stationary structural part of said vehicle, the adjustable connection between said one end of said leg and said platform portion comprising an angle bracket having one side thereof secured to said platform portion and a right angle side thereof secured to said one end of said leg, said right angle side being formed with an elongated slot, and a bolt received in said slot and through a cooperating opening in said leg whereby compound adjustment of said leg with respect to said platform portion can be accommodated.

2. A serving tray for use in the interior of a vehicle comprising a platform portion, a pair of straps connected to one margin of said platform portion and extending beyond said margin, said straps being bent whereby they are adapted to be received within cooperating slots formed in a structural portion of said vehicle, said straps being substantially equidistant from the geometric center line of said platform portion, a bracket secured to said platform portion at an opposite margin thereof and at a position adjacent to said geometric center line, a supporting leg, an adjustable connection between one end of said supporting leg and said bracket, said adjustable connection accommodating an adjustment of said one end in a direction parallel to the plane of said platform portion, said adjustable connection providing also angular adjustment of said leg with respect to the plane of said platform portion, a friction foot carried by the other end of said leg, said friction foot being adapted to engage a stationary structural part of said vehicle, the adjustable connection between said one end of said leg and said platform portion comprising an angle bracket having one side thereof secured to said platform portion and a right angle side thereof secured to said one end of said leg, said right angle side being formed with an elongated slot, and a bolt received in said slot and through a cooperating opening in said leg whereby compound adjustment of said leg with respect to said platform portion can be accommodated, said leg being located substantially on the geometric plane of symmetry of said platform portion.

References Cited by the Examiner

UNITED STATES PATENTS

| | | | |
|---|---|---|---|
| 1,820,635 | 8/31 | Strickland | 108—11 |
| 2,718,445 | 9/55 | Wilson | 108—44 |
| 2,825,611 | 3/58 | Aynesworth | 108—45 |
| 2,868,484 | 1/59 | Jennings | 108—45 |
| 2,949,334 | 8/60 | Amerpohl | 108—46 |

FRANK B. SHERRY, *Primary Examiner.*